(12) United States Patent
Nakajima et al.

(10) Patent No.: US 11,648,806 B2
(45) Date of Patent: May 16, 2023

(54) TIRE

(71) Applicant: Sumitomo Rubber Industries, Ltd., Kobe (JP)

(72) Inventors: Koichi Nakajima, Kobe (JP); Tetsuya Sakaguchi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 17/406,124

(22) Filed: Aug. 19, 2021

(65) Prior Publication Data
US 2022/0055415 A1 Feb. 24, 2022

(30) Foreign Application Priority Data
Aug. 24, 2020 (JP) .............................. JP2020-141062

(51) Int. Cl.
*B60C 13/00* (2006.01)

(52) U.S. Cl.
CPC .................................. *B60C 13/001* (2013.01)

(58) Field of Classification Search
CPC ............................. B60C 13/001; B60C 13/02
See application file for complete search history.

(56) References Cited

U.S. PATENT DOCUMENTS

| | | | | |
|---|---|---|---|---|
| 2002/0174928 A1* | 11/2002 | Ratliff, Jr. | ............. | B60C 13/001 152/555 |
| 2010/0051159 A1* | 3/2010 | Fujioka | ................. | B60C 13/001 152/523 |
| 2010/0139831 A1* | 6/2010 | Takahashi | ............... | B60C 13/02 152/523 |
| 2020/0262251 A1* | 8/2020 | Sakaguchi | ............ | B60C 13/001 |
| 2021/0188018 A1* | 6/2021 | Iwabuchi | ................ | B60C 11/03 |

FOREIGN PATENT DOCUMENTS

| | | |
|---|---|---|
| EP | 3 519 209 B1 | 8/2020 |
| EP | 3 693 191 A1 | 8/2020 |
| JP | 9-323513 A | 12/1997 |
| JP | 11-321243 | * 11/1999 |
| JP | 2003-320818 A | 11/2003 |
| JP | 2007-083604 | * 4/2007 |
| WO | 2014/202731 A1 | 12/2014 |
| WO | 2018/059751 A1 | 4/2018 |
| WO | 2019/111828 A1 | 6/2019 |

OTHER PUBLICATIONS

English machine translation of JP11-321243. (Year: 1999).*
English machine translation of JP2007-083604. (Year: 2007).*
English machine translation of Hiro (JP2003-320818) (Year: 2003).*
Extended European Search Report dated Jan. 18, 2022 in European Patent Application No. 21190316.6, 7 pages.

* cited by examiner

*Primary Examiner* — Robert C Dye
(74) *Attorney, Agent, or Firm* — Xsensus LLP

(57) ABSTRACT

At least one mark formed by a character or a figure and a surface geometry arrangement region disposed adjacent to the mark outside the mark can be formed on a surface of a sidewall portion of a tire. The surface geometry arrangement region can have a plurality of micro projections. The surface geometry arrangement region can include a first region formed in at least a part of the surface geometry arrangement region such that the greater a distance from the mark is, the less a height of the micro projection can be.

10 Claims, 12 Drawing Sheets

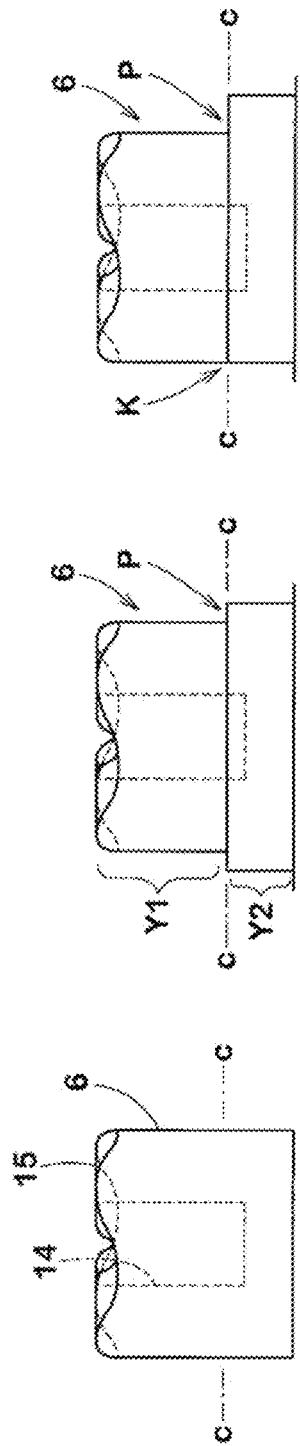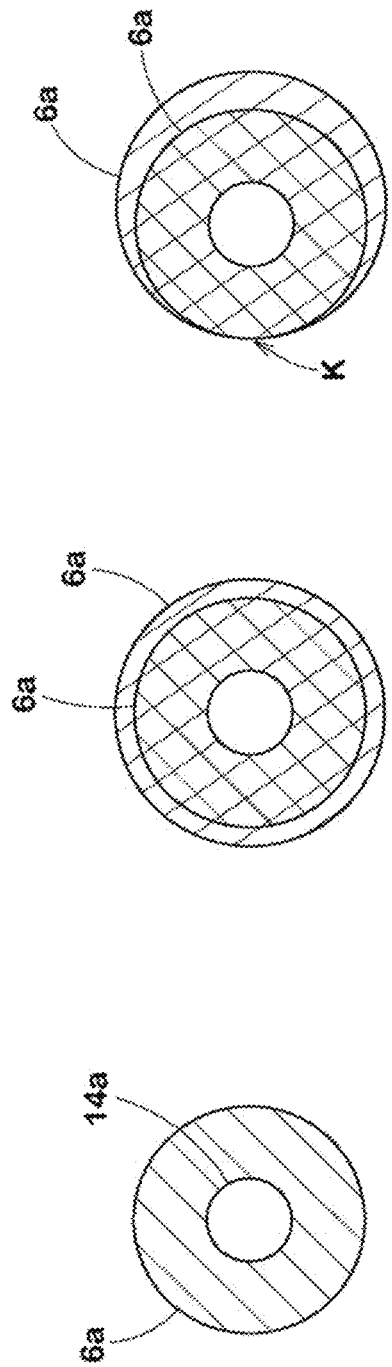
FIG. 10A  FIG. 10B  FIG. 10C

TIRE

CROSS-REFERENCE TO RELATED APPLICATION

The present application claims priority to Japanese patent application JP 2020-141062, filed on Aug. 24, 2020, the entire contents of which are incorporated herein by reference in its entirety.

BACKGROUND

Technical Field

The present disclosure relates to a tire having a surface geometry arrangement formed on an outer surface of a sidewall portion.

Description of the Background Art

A tire may have marks formed by characters or figures which represent a manufacturer name, a brand name, or the like of the tire, on a surface of a sidewall portion. Such a mark may be in the form of a projecting mark that projects from the surface of the sidewall portion or a recessed mark that is recessed from the surface in order to enhance visibility.

However, the projecting mark may cause deterioration of air resistance, so that the projecting mark should not be formed so as to extend excessively from the surface of the sidewall portion. On the other hand, the recessed mark should not be formed so as to become so deep due to restriction of the thickness of a rubber gauge in the sidewall portion. At least for these reasons, it can be difficult to sufficiently enhance visibility of the mark.

Meanwhile, Japanese Laid-Open Patent Publication No. H9-323513 ("JP '513 publication") discloses a tire in which a second background pattern indicating a mark and a first background pattern adjacent to the second background pattern are formed on a surface of a sidewall portion. The first background pattern has an irregular mosaic pattern that is formed by multiple ridges interrupted by a plurality of surface patterns.

According to the JP '513 publication, in the tire, the design can be enhanced by the mosaic pattern, and the mosaic pattern can prevent defective appearance called bulges and dents generated during production from becoming conspicuous. However, visibility of the mark may be insufficient and required to be further enhanced.

The present disclosure has been made in view of the aforementioned problem (and additional problems). As such, embodiments of the present disclosure can provide a tire that can allow enhancement of visibility of a mark formed on a surface of a sidewall portion.

SUMMARY

The present disclosure is directed to a tire including a sidewall portion. At least one mark formed by a character or a figure is disposed on a surface of the sidewall portion. A surface geometry arrangement region having a plurality of micro projections can be formed adjacent to the mark on the surface of the sidewall portion outside the mark. The surface geometry arrangement region can include a first region formed in at least a part of the surface geometry arrangement region such that the greater a distance from the mark is, the less a height of the micro projections is.

A tire of the present disclosure is a tire including a sidewall portion. At least one mark formed by a character or a figure is disposed on a surface of the sidewall portion. A surface geometry arrangement region having a plurality of micro projections can be formed adjacent to the mark on the surface of the sidewall portion outside the mark. The surface geometry arrangement region can include a third region formed in at least a part of the surface geometry arrangement region such that the greater a distance from the mark is, the less dense the micro projections are.

BRIEF DESCRIPTION OF THE DRAWINGS

FIGS. 10A to 10C each illustrate a side view of a micro projection according to still another embodiment of the present disclosure, along with a plan view of a cross-sectional shape of the micro projection at positions on a line c-c in each side view;

DETAILED DESCRIPTION

Embodiments of the present disclosure will be described below in detail.

Figure 1:
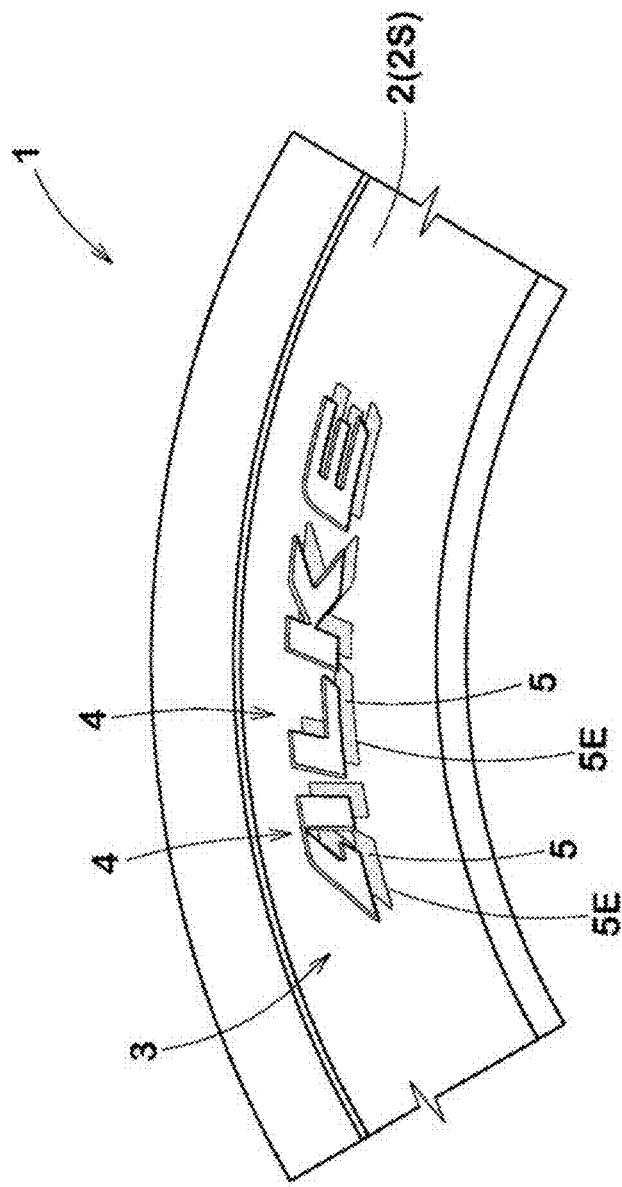
FIG. 1 is a partial side view of a sidewall portion of a tire according to a first embodiment of the present disclosure.
Figure 2:
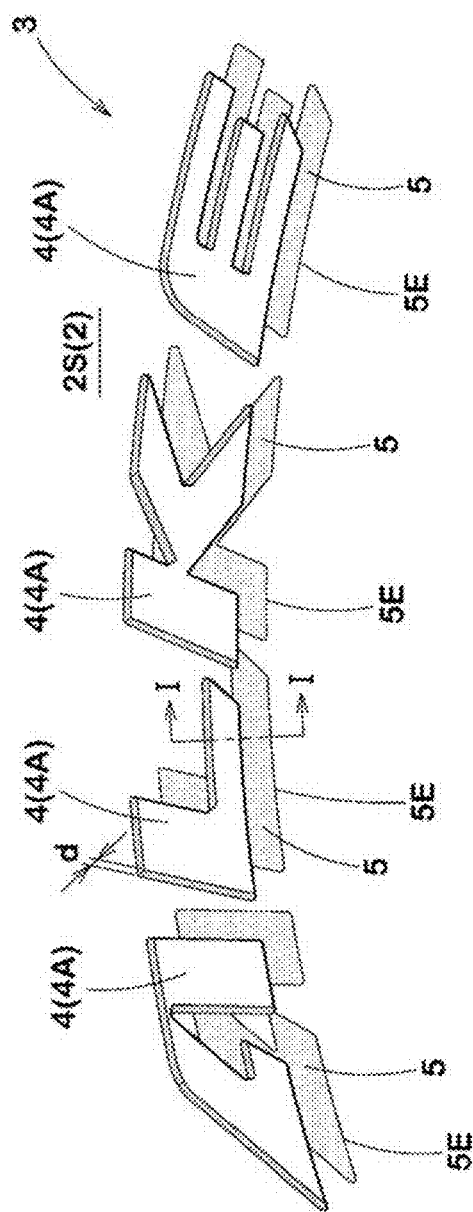
FIG. 2 is a partially enlarged side view of FIG. 1 conceptually illustrating a recessed mark and a surface geometry arrangement region.

As shown in FIG. 1 and FIG. 2, a tire 1 of according to a first embodiment of the present disclosure can have indicia 3 representing, for example, a manufacturer name, a brand name, and/or a size of the tire, on a surface 2S of at least one sidewall portion 2.

The indicia 3 can include at least one mark 4. The mark 4 can be in the form of a character or a figure, and may be a minimum unit of the indicia 3. In this embodiment, the indicia 3 are in the form of a character string of "ALKE" representing, for example, a brand name, by four marks 4 of "A", "L", "K", and "E".

A surface geometry arrangement region 5 can be formed adjacent to the mark 4 on the surface 2S of the sidewall portion 2, outside the mark 4.

The surface geometry arrangement region 5 can have a relatively shape edge 5E defining the outer edge of the surface geometry arrangement region 5. In this embodiment, the shape formed by the shape edge 5E and the outline shape of the mark 4 are substantially the same. The surface geometry arrangement region 5 can be formed as a portion projecting from the mark 4 when the shape edge 5E is shifted from the mark 4, for example, toward the tire 1 radially inner side and toward one side in a tire circumferential direction.

Figure 3:
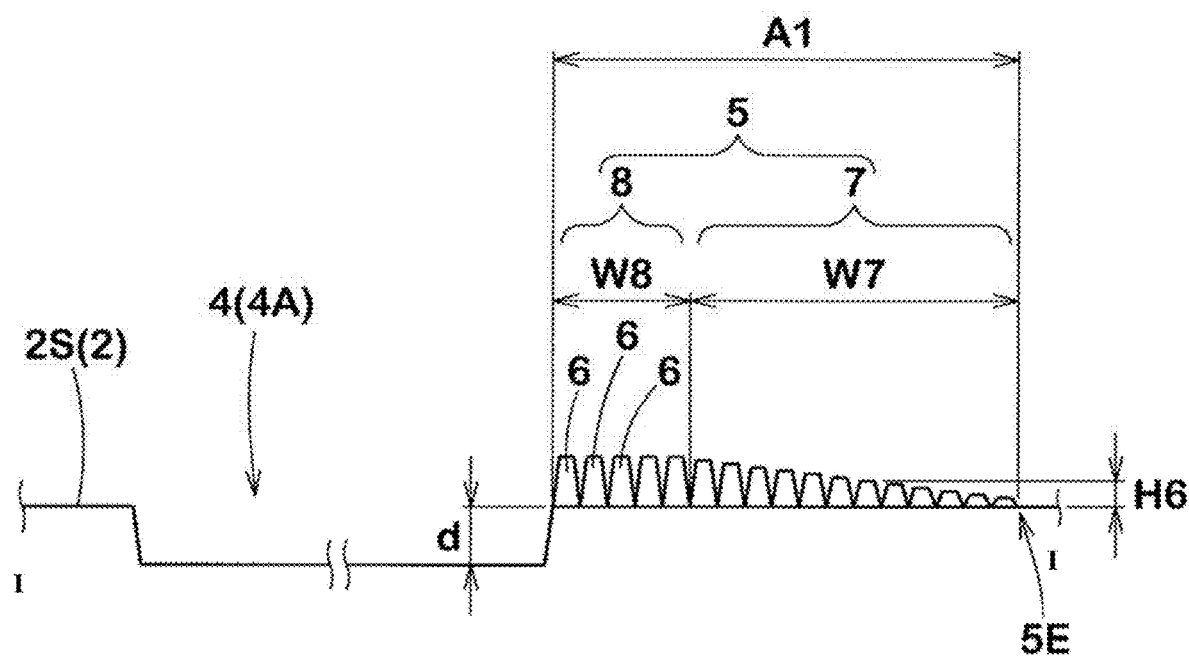
FIG. 3 is a cross-sectional view of the recessed mark and the surface geometry arrangement region as taken along a line I-I in FIG. 2.

FIG. 3 shows a cross-section taken along a line I-I in FIG. 2. As shown in FIG. 3, the surface geometry arrangement region 5 can have a plurality of micro projections 6 disposed adjacent to each other. Micro projections 6, as implemented according to one or more embodiments of the disclosed subject matter, may be characterized or defined as "micro" in at least the width dimension (in the left-right direction of FIG. 3) relative to the width of the mark 4, such as shown in FIG. 3.

The surface geometry arrangement region 5 can include at least a first region 7. In this embodiment, the surface geometry arrangement region 5 can include the first region 7 and a second region 8.

The first region 7 can be formed such that the greater a distance from the mark 4 is, the less a height H6 of the micro projection 6 is. That is, the heights of the micro projections can decrease going away from the mark 4, such as shown in FIG. 3. The first region 7 can be disposed along the shape edge 5E of the surface geometry arrangement region 5. The first region 7 of the present embodiment can be formed such that the heights H6 of the micro projections 6 adjacent to each other are continuously reduced. In another exemplary case, the heights H6 of the micro projections 6 adjacent to each other may be reduced stepwise.

Meanwhile, in the second region 8, the micro projections 6 can be disposed so as to have a constant height H6. The second region 8 can be disposed between the first region 7 and the mark 4.

In the surface geometry arrangement region 5 of this embodiment, the first region 7 and the second region 8 can be different from each other only in the heights of the micro projections 6, and the density or thickness at which the micro projections 6 are disposed can be constant. In this embodiment, in the first region 7 and the second region 8, the micro projections 6 can be disposed adjacent to each other, for instance, such that bottoms or bases of the micro projections 6 touch. However, the micro projections 6 may be disposed at certain intervals, i.e., a certain amount of space between the micro projections 6.

In the surface geometry arrangement region 5 having such a structure, the plurality of micro projections 6 can inhibit light from being reflected and can enhance light absorptivity. Therefore, the surface geometry arrangement region 5 can be allowed to look darker as compared with a region other than the surface geometry arrangement region 5. Furthermore, the first region 7 can be formed such that the greater a distance from the mark 4 is, for instance, the less the height H6 of the micro projection 6 is, so that light absorptivity can be gradually reduced, and a region farther from the mark 4 can become brighter.

Thus, as shown in FIG. 1 and FIG. 2, the shadow of the mark 4 can be rendered by the surface geometry arrangement region 5, and, for example, the mark 4 can thus be allowed to appear as if it floats. As a result, the appearance of the mark 4 can be enhanced, and the mark 4 can be represented with a stereoscopic effect, for instance, to enhance visibility of the mark 4. Particularly, the periphery of the surface geometry arrangement region 5 can be blurred by the first region 7, and the surface geometry arrangement region 5 can be allowed to more closely resemble an actual shadow.

FIGS. 1 to 3 illustrate a case where the mark 4 can be formed as a recessed mark 4A having a depth d. In this case, as shown in FIG. 3, a shortest distance A1 from an outer edge of the recessed mark 4A to an outer edge (the shape edge 5E) of the surface geometry arrangement region 5 can be greater than the depth d, as viewed from the front of the sidewall portion 2. Particularly, the shortest distance A1 can be 4 to 30 times the depth d of the recessed mark 4A, for instance.

By setting the shortest distance A1 in this manner, the apparent floating height of the recessed mark 4A may be increased and visibility of the recessed mark 4A can be further enhanced. If the shortest distance A1 is less than 4 times the depth d, a stereoscopic effect may not be ideal, and an effect of enhancing visibility may not be sufficiently exhibited. Conversely, if the shortest distance A1 is greater than 30 times the depth d, the impression as a shadow may be weakened, the recessed mark 4A may not appear as if it floats, and the stereoscopic effect may be degraded. From these standpoints, according to one or more embodiments, to create respective buffers, for instance, the lower limit of the shortest distance A1 may be not less than 8 times the depth d, and the upper limit thereof may be not greater than 12 times the depth d.

In a case where the second region 8 is disposed, only the periphery of the surface geometry arrangement region 5 may be blurred, and the surface geometry arrangement region 5 can be allowed to more closely resemble an actual shadow while the shortest distance A1 is sufficiently ensured. In a case where the second region 8 is not disposed, or in a case where a proportion of a width W8 of the second region 8 to the shortest distance A1 is relatively small, blackness of the surface geometry arrangement region 5 may be reduced, and impression as a shadow may be weakened.

Therefore, a width W7 of the first region 7 can be 2 to 6 times the width W8 of the second region 8, for instance. If the width W7 is less than twice the width W8, an effect of blurring the periphery of the surface geometry arrangement region 5 may not be ideal, and the surface geometry arrangement region 5 may be less likely to be recognized as a shadow. Conversely, if the width W7 is greater than 6 times the width W8, contrast with the mark 4 may be reduced, and an effect of allowing the mark 4 to appear as if it floats or the stereoscopic effect of the mark 4 may be reduced. From these standpoints, according to one or more embodiments of the disclosed subject matter, to create respective buffers, for instance, the lower limit of the width W7 may not be less than 4 times the width W8, and the upper limit thereof may be not greater than 5 times the width W8.

Figure 4:
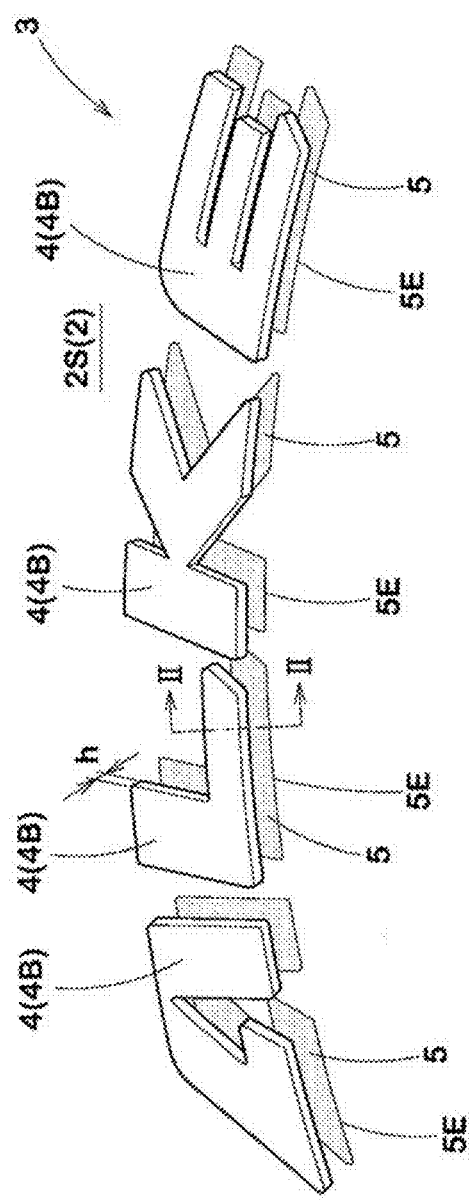
FIG. 4 is a partially enlarged side view conceptually illustrating a projecting mark and a surface geometry arrangement region.
Figure 5:
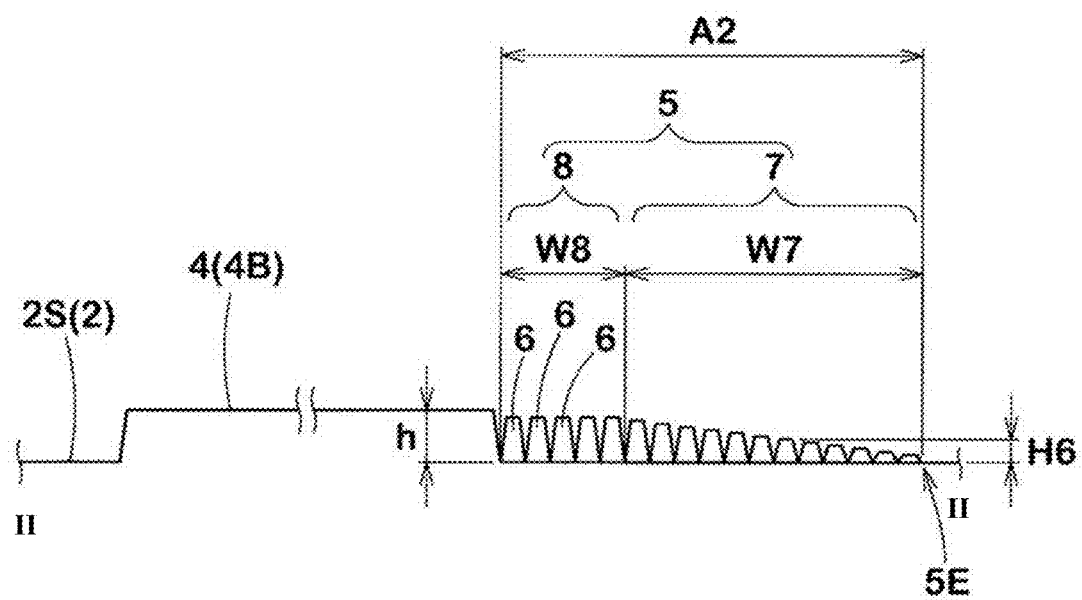
FIG. 5 is a cross-sectional view of the projecting mark and the surface geometry arrangement region as taken along a line II-II in FIG. 4.

FIG. 4 and FIG. 5 illustrate a case where the mark 4 can be in the form of a projecting mark 4B having a height h. In this case, as shown in FIG. 5, a shortest distance A2 from an outer edge of the mark 4 to the outer edge (the shape edge 5E) of the surface geometry arrangement region 5 can be 0.6 to 30 times the height h of the mark 4, for instance, as viewed from the front of the sidewall portion 2.

By setting the shortest distance A2 in this manner, the apparent floating height of the projecting mark 4B can be increased and visibility of the projecting mark 4B can be further enhanced, as in the case of the recessed mark 4A. If the shortest distance A2 is less than 0.6 times the height h, a stereoscopic effect may not be ideal and an effect of enhancing visibility may not be sufficiently exhibited. Conversely, if the shortest distance A2 is greater than 30 times the height h, impression as a shadow may be weakened, the projecting mark 4B may not appear as if it floats, and the stereoscopic effect may tend to be degraded. From these standpoints, according to one or more embodiments of the disclosed subject matter, to create respective buffers, for instance, the lower limit of the shortest distance A2 can be not less than 10 times the height h, and the upper limit thereof can be not greater than 15 times the height h.

Also for the projecting mark 4B, as in the case of the recessed mark 4A, the second region 8 can be disposed between the first region 7 and the mark 4, and the width W7 of the first region 7 can be 2 to 6 times the width W8 of the second region 8, for instance. Particularly, the lower limit of the width W7 can be not less than 4 times the width W8, and the upper limit thereof can be not greater than 5 times the width W8.

Figure 6:
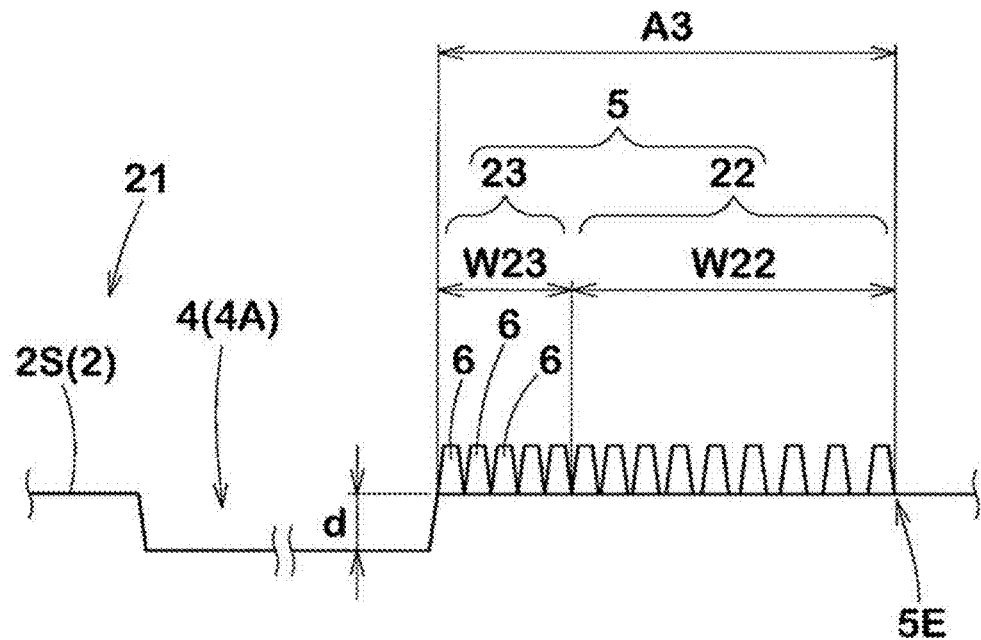
FIG. 6 is a cross-sectional view of a recessed mark and a surface geometry arrangement region of a tire according to a second embodiment of the present disclosure.
Figure 7:
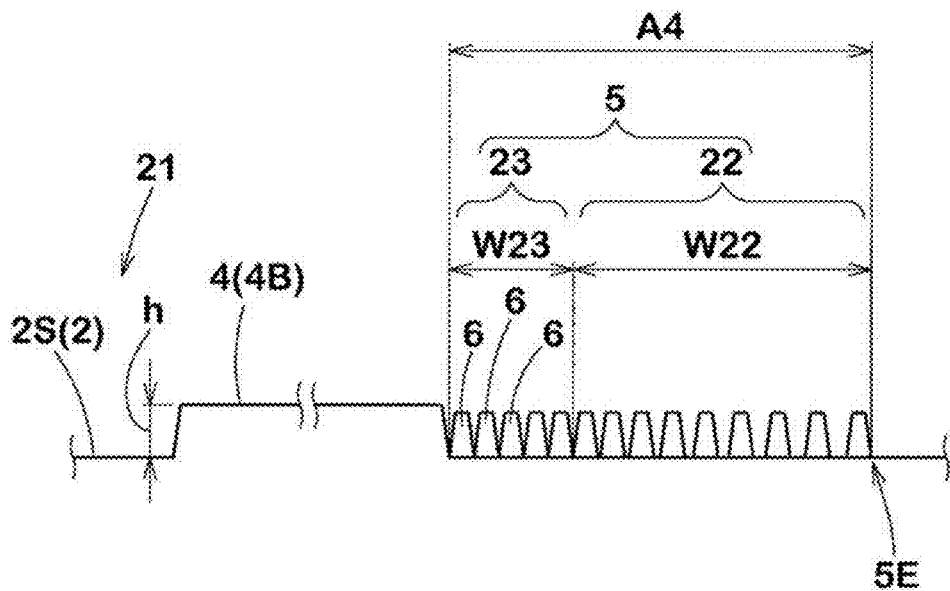
FIG. 7 is a cross-sectional view of a projecting mark and a surface geometry arrangement region of the tire according to the second embodiment of the present disclosure.

Next, a tire 21 of a second embodiment according to the present disclosure will be described. The tire 21 of the second embodiment and the tire 1 of the first embodiment can have substantially the same structure except that a third region 22 can be formed instead of the first region 7, such as shown in FIG. 6 and FIG. 7.

Specifically, at least one mark 4 can be formed on the surface 2S of the sidewall portion 2. Furthermore, the surface geometry arrangement region 5 having a plurality of micro projections 6 disposed adjacent to each other can be formed adjacent to the mark 4, on the surface 2S of the sidewall portion 2, outside the mark 4.

In the tire 21 of the second embodiment, the surface geometry arrangement region 5 can include at least the third region 22. In this embodiment, the surface geometry arrangement region 5 can include the third region 22 and a fourth region 23.

The third region 22 can be formed such that the greater a distance from the mark 4 is, the less the density of the micro projections 6 is. The third region 22 of the present embodiment can be formed such that the density of the micro projections 6 is continuously reduced. That is, as the micro projections move away from the mark 4 more space can be provided between the micro projections 6, such as shown in FIG. 6 and FIG. 7. In another exemplary case, the density of the micro projections 6 may be reduced stepwise. The third region 22 may be disposed along the shape edge 5E and can define the outer edge of the surface geometry arrangement region 5. Meanwhile, in the fourth region 23, the micro projections 6 can be disposed at a constant density, and the fourth region 23 can be disposed between the third region 22 and the mark 4. In this embodiment, in the fourth region 23, the micro projections 6 can be disposed adjacent to each other, for instance, such that bases or bottoms of the micro projections 6 touch, such as shown in FIG. 5 and FIG. 6. However, the micro projections 6 may be disposed at certain intervals, i.e., a certain amount of space between the micro projections 6.

The "density" of the micro projections 6 can be defined as a proportion of the sum of the bottom areas of the micro projections 6 in a unit area. In other words, the density can be defined as a ratio/s/S of the sum/s of areas s (corresponding to cross-sectional areas of the micro projections 6 at the lower ends) of bottom surfaces of the micro projections 6 formed in a surface having a unit area, to the unit area S.

In the surface geometry arrangement region 5 having such a structure, the plurality of micro projections 6 can inhibit light from being reflected and can enhance light absorptivity. Therefore, the surface geometry arrangement region 5 can be allowed to look darker as compared with a region other than the surface geometry arrangement region 5. Furthermore, the third region 22 can be formed such that the greater a distance from the mark 4 is, the less the density of the micro projections 6 is, so that light absorptivity can be gradually reduced, and a region farther from the mark 4 can become brighter, as in the first region 7.

Thus, the shadow of the mark 4 can be rendered by the surface geometry arrangement region 5, and, for example, the mark 4 can thus allowed to appear as if it floats. As a result, the appearance can be enhanced and the mark 4 can be represented with a stereoscopic effect, for instance, to enhance visibility of the mark 4. Particularly, the periphery of the surface geometry arrangement region 5 can be blurred by the third region 22, and the surface geometry arrangement region 5 can be allowed to more closely resemble an actual shadow.

FIG. 6 illustrates a case where the mark 4 is formed as a recessed mark 4A having a depth d. In this case, a shortest distance A3 from an outer edge of the recessed mark 4A to an outer edge (the shape edge 5E) of the surface geometry arrangement region 5 can be greater than the depth d, as viewed from the front of the sidewall portion 2. Particularly, the shortest distance A3 can be 4 to 30 times the depth d of the recessed mark 4A for the same reason as for the shortest distance A1 of the first embodiment, for instance. Particularly, the lower limit of the shortest distance A3 can be not less than 8 times the depth d, and the upper limit thereof can be not greater than 12 times the depth d, for instance, to create respective buffers.

In a case where the fourth region 23 is disposed, only the periphery of the surface geometry arrangement region 5 may be blurred, and the surface geometry arrangement region 5 can be allowed to more closely resemble an actual shadow while the shortest distance A3 is sufficiently ensured. In a case where the fourth region 23 is not disposed, or in a case where a proportion of a width W23 of the fourth region 23 to the shortest distance A3 is relatively small, blackness of the surface geometry arrangement region 5 may be reduced, and impression as a shadow may be weakened.

Therefore, a width W22 of the third region 22 can be 2 to 6 times the width W23 of the fourth region 23 for the same reason as for the relationship W7/W8 between the width W7 and the width W8 in the first embodiment, for instance. Particularly, the lower limit of the width W22 can be not less than 4 times the width W23, and the upper limit thereof can be not greater than 5 times the width W23, for instance, to create respective buffers.

FIG. 7 illustrates a case where the mark 4 is in the form of a projecting mark 4B having a height h. In this case, a shortest distance A4 from an outer edge of the projecting mark 4B to the outer edge (the shape edge 5E) of the surface geometry arrangement region 5 can be 0.6 to 30 times the height h of the projecting mark 4B, for instance, as viewed from the front of the sidewall portion 2, for the same reason as for the shortest distance A2.

Also for the projecting mark 4B, as in the case of the recessed mark 4A, the fourth region 23 can be disposed between the third region 22 and the mark 4, and the width W22 of the third region 22 can be 2 to 6 times the width W23 of the fourth region 23, for instance. Particularly, the lower limit of the width W22 can be not less than 4 times the width W23, and the upper limit thereof can be not greater than 5 times the width W23, for instance, to create respective buffers.

In the third region 22, the heights of the micro projections 6 may not necessarily be constant. In this case, the third region 22 can be formed such that the greater a distance from the mark 4 is, the less the height of the micro projection 6 is, as in the first region 7. In this case, the periphery of the surface geometry arrangement region 5 can be further blurred, and the surface geometry arrangement region 5 can be allowed to more closely resemble an actual shadow.

In the tire 1 of the first embodiment and the tire 21 of the second embodiment, the height H6 of the micro projection 6 can be less than the depth d or the height h of the mark 4.

<Micro Projection 6>

Next, the micro projection 6 used in the tire 1 of the first embodiment and the tire 21 of the second embodiment will be described.

Figure 8A:
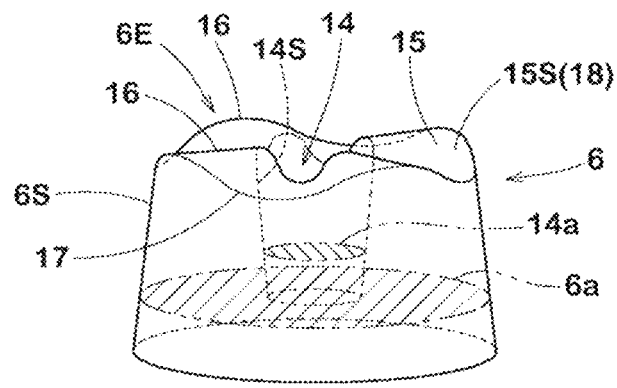
FIGS. 8A and 8B are a perspective view and a side view, respectively, of a micro projection according to one or more embodiments of the present disclosure.
Figure 8B:
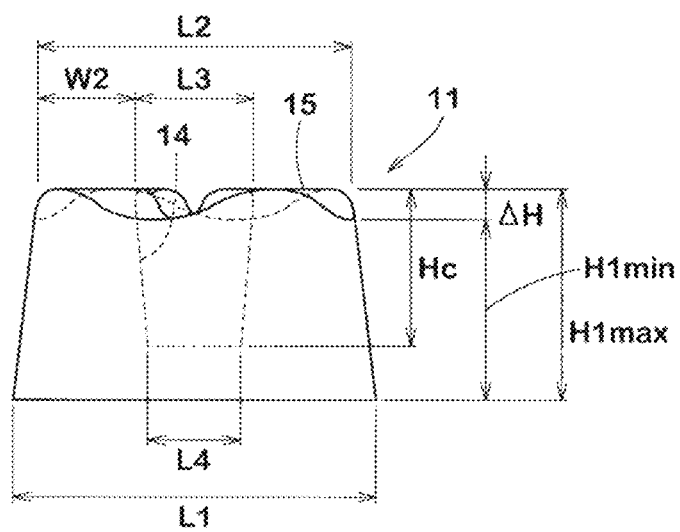

As shown in FIG. 8A and FIG. 8B, column-shaped projections can be used as the micro projections 6. The column-shaped projection can represent, for example, a round-columnar, a prism-shaped, conical, a truncated-cone-shaped, or a pyramidal projection that projects from the surface 2S of the sidewall portion 2, and may distinguished from an elongated ridge that extends along the sidewall portion 2. The column-shaped micro projection 6 may have a flat upper end or a sharp upper end. As in this embodiment, the micro projection 6 particularly can include a recess 14 disposed in the upper end, and an outer wall portion 15 that has, for example, a tubular shape, that surrounds the recess 14, and that can form a projection top 6E.

When light is applied to the micro projection 6 having such a structure, light applied to an outer side face 6S (corresponding to an outer side face of the outer wall portion 15) of the micro projection 6 can be diffused, and the surface geometry arrangement region 5 can thus look blackish. Furthermore, the light applied to the projection top 6E may be mainly reflected only by a top face 15S of the outer wall portion 15, and light can be absorbed in the recess 14. Therefore, the projection top 6E may also look blackish, and contrast with a region other than the surface geometry arrangement region 5, for example, with the mark 4 being enhanced and visibility being enhanced.

Figure 13:
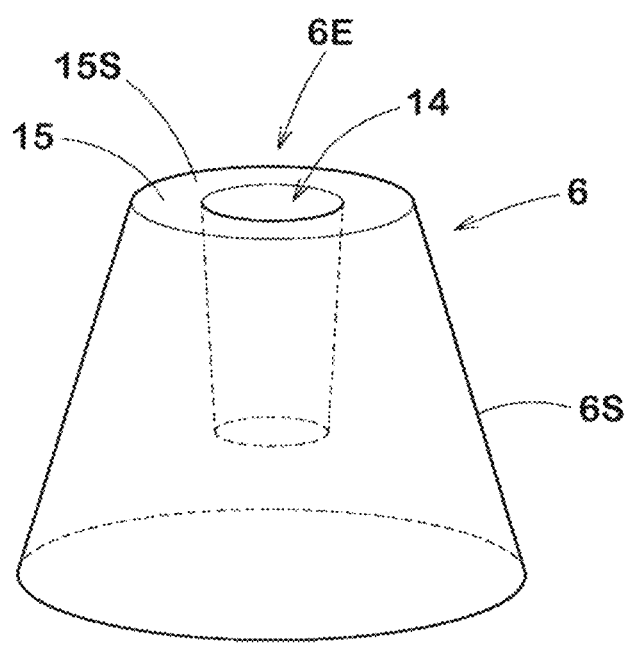
FIG. 13 is a perspective view of a micro projection according to still another embodiment of the present disclosure.

In this embodiment, the outer wall portion 15 of the micro projection 6 can include at least two mountain portions 16, each having a relatively large projection height in the projection height direction. In this embodiment, the outer wall portion 15 can form a tubular shape, and the mountain portions 16 and valley portions 17 each can have a relatively small projection height alternate in the circumferential direction. As shown in FIG. 13, for instance, the top face 15S may be flat.

In this embodiment, the top face 15S of the outer wall portion 15 can form a curved surface 18 in which the mountain portions 16 and the valley portions 17 are connected in a wavy manner by smooth curved surfaces.

In the micro projection 6 having such a structure, the top face 15S of the outer wall portion 15 can be in the form of a surface that includes two or more mountain portions 16, so that light can be diffused also at the top face 15S and the projection top 6E can be allowed to look more blackish. Thus, the micro projections 6 of this embodiment can allow the surface geometry arrangement region 5 to look darker (more blackish) by a synergistic effect of light diffusion at the outer side face 6S, light absorption in the recess 14, and light diffusion at the top face 15S of the outer wall portion 15, as compared with, for example, truncated-cone-shaped micro projections that do not have the recess 14 in the upper end.

The number of the mountain portions 16 formed can be 3 to 6, for instance, in order to enhance a light diffusing effect.

The micro projection 6 can have a cross-sectional shape 6a orthogonal to the projection height direction. The cross-sectional shape 6a can be circular or ellipsoidal, for instance. In the case of a circular shape, light applied from any direction can be similarly diffused. Therefore, contrast can be stably enhanced without having directivity. Meanwhile, in the case of an ellipsoidal shape, diffusion of light applied from the major axis side of the ellipsoidal shape and diffusion of light applied from the minor axis side can be made different. Therefore, the contrast can have directivity, and an unexpected outer appearance may be represented.

In the micro projection 6, the cross-sectional shape 6a can be formed so as to be smaller on the upper end side (the projection top 6E side) than on the lower end side (root side of the projection). The micro projection 6 having such a structure can have a relatively high stiffness at the lower end side. Therefore, the micro projection 6 may not be easily deformed, chipping and cracking can be inhibited, and visibility can be ensured for a relatively long time period. In this embodiment, the cross-sectional shape 6a of the micro projection 6 can become gradually smaller from the lower end side toward the upper end side. More specifically, in the micro projection 6 of this embodiment, the outer side face 6S can be tapered from the lower end side toward the upper end side over the entire length. However, the cross-sectional shape 6a is not limited thereto.

As shown in FIG. 8B, a maximum width L1 of the micro projection 6 can be 0.30 to 1.00 mm, for instance. The micro projection 6 can have the maximum width L1 at the lower end. In the micro projection 6 having such a structure, a dark portion of a shadow formed by applied light can be assuredly enlarged. In a case where the maximum width L1 of the micro projection 6 is less than 0.30 mm, the stiffness of the micro projection 6 may be lowered, and cracking and chipping may be likely to occur. In a case where the maximum width L1 of the micro projection 6 is greater than 1.00 mm, light applied to the outer side face 6S of the micro projection 6 may be increased and the outer side face 6S can become brighter, so that contrast with the mark 4 may be lowered.

In order to effectively exhibit the above-described effects, a minimum width L2 of the micro projection 6 can be 0.25 to 0.95 mm, for instance. The micro projection 6 can have the minimum width L2 at the upper end. Thus, a dark portion can be formed while stiffness is ensured.

The micro projection 6 can have a maximum height H1max at the mountain portion 16, and can have a minimum height H1min at the valley portion 17. The maximum height H1max can be 0.20 to 0.60 mm, for instance. In a case where the maximum height H1max is less than 0.20 mm, the micro projection 6 may be excessively low, the light diffusing effect may be lowered, and the contrast may not become sufficient. Meanwhile, in a case where the maximum height H1max is greater than 0.60 mm, the micro projection 6 may tend to be more easily damaged.

In a case where the micro projection 6 has the maximum height H1max, the maximum height H1max can be defined as the height H6 of the micro projection 6.

Furthermore, the minimum height H1min can be 0.10 to 0.50 mm, for instance. Particularly, a difference $\Delta H = (H1max - H1min)$ between the maximum height H1max and the minimum height H1min can be 0.10 to 0.40 mm, for instance. In a case where the difference ΔH is less than 0.10 mm, it may be difficult to effectively obtain a light diffusing effect at the top face 15S of the outer wall portion 15. Conversely, in a case where the difference ΔH is greater than 0.40 mm, the mountain portion 16 may tend to be more easily damaged.

A thickness W2 of the outer wall portion 15 at the upper end may not be greater than 0.20 mm. In a case where the thickness W2 is greater than 0.20 mm, the recess 14 can become smaller and an effect of allowing the micro projection 6 to look blackish may tend to be lowered. The lower limit of the thickness W2 can be not less than 0.05 mm, for instance. If the lower limit is less than 0.05 mm, stiffness of the micro projection 6 can be lowered and the micro projection 6 may tend to be more easily damaged.

As shown in FIG. 8A, the recess 14 can have a cross-sectional shape 14a orthogonal to the depth direction. The cross-sectional shape 14a can be circular or ellipsoidal, for instance. The recess 14 having such a structure can contribute to maintaining relatively high stiffness of the micro projection 6, which can absorb light from multiple directions, and allow the micro projection 6 to look blackish. In this embodiment, the cross-sectional shape 14a of the recess 14 can be circular. In the case of an ellipsoidal shape, contrast can have directivity and unexpected outer appearance may be represented.

The cross-sectional shape 14a of the recess 14 can be formed so as to be larger on the upper end side than on the lower end side. The micro projection 6 having such a structure can exhibit a relatively high stiffness on the lower end side, so that the micro projection 6 may not be easily deformed, and chipping and cracking can be inhibited. In this embodiment, the cross-sectional shape 14a can be gradually enlarged from the lower end side toward the upper end side. More specifically, in the micro projection 6 of this embodiment, an inner side face 14S of the recess 14 can be reversely tapered from the lower end side toward the upper end side over the entire length. However, the cross-sectional shape 14a is not limited thereto.

As shown in FIG. 8B, a depth Hc of the recess 14 from the mountain portion 16 can be 15% to 100% of the maximum height H1max of the micro projection 6, for instance. In a case where the depth Hc is less than 15% thereof, light may tend to be reflected at the bottom surface of the recess 14, and an effect of allowing the micro projection 6 to look blackish may be lowered. In a case where the depth Hc is greater than 100% thereof, stiffness of the micro projection 6 may be lowered, and the micro projection 6 may tend to be more easily damaged. Therefore, the depth Hc may not be greater than 90% of the maximum height H1max, for instance, to create a buffer. The depth Hc can be in a range of 0.15 to 0.60 mm, for instance.

A maximum width L3 of the recess 14 can be 0.10 to 0.90 mm, for instance. Optionally, the recess 14 can have the maximum width L3 at the upper end. In a case where the maximum width L3 is less than 0.10 mm, an effect of absorbing light by the recess 14 may tend to be lowered. In a case where the maximum width L3 is greater than 0.90 mm, stiffness of the micro projection 6 may be lowered, and the micro projection 6 may tend to be more easily damaged.

A minimum width L4 of the recess 14 is not particularly limited. However, according to one or more embodiments of the present disclosure, the minimum width L4 may not be greater than the maximum width L3, for instance, not greater than 70% of the maximum width L3. Optionally, the recess 14 can have the minimum width L4 at the lower end.

Figure 9:
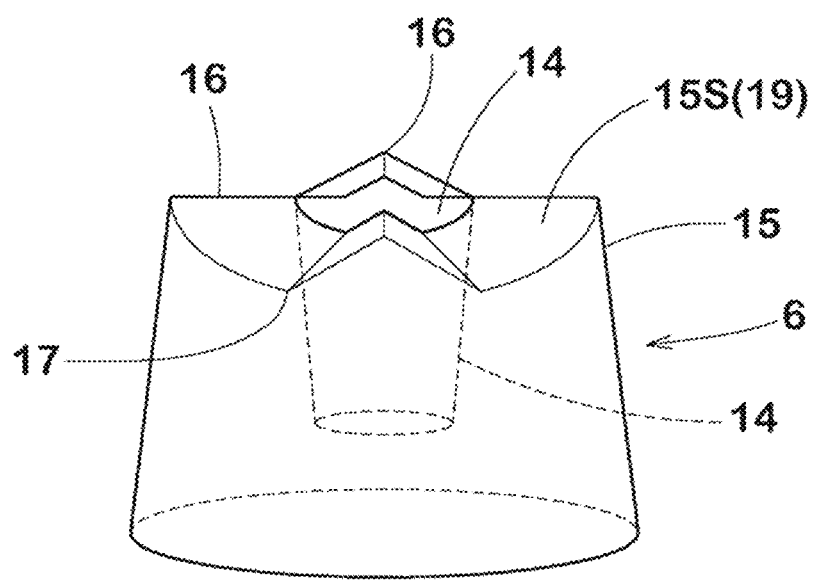
FIG. 9 is a perspective view of a micro projection according to another embodiment of the present disclosure.

FIG. 9 is a perspective view of a micro projection 6 according to another embodiment of the present disclosure. The same components between the micro projection 6 of the present embodiment and the micro projections 6 of the above-described embodiments are denoted by the same reference characters, and detailed description thereof is omitted. As shown in FIG. 9, in the micro projection 6, the top face 15S of the outer wall portion 15 surrounding the recess 14 can be in the form of or include a bent surface 19 in which the mountain portions 16 and the valley portions 17 can be connected by flat inclined surfaces. Also in this case, the top face 15S can allow the same effect as that of the curved surface 18 (shown in FIG. 8A and FIG. 8B) to be exhibited.

FIGS. 10A to 10C are each a side view of a micro projection 6 according to still another embodiment of the present disclosure, and illustrate a cross-sectional shape 6a of the micro projection 6 at positions on a line c-c in each side view. The same components between the micro projection 6 of the present embodiment and the micro projections 6 of the above-described embodiments are denoted by the same reference characters, and detailed description thereof is omitted.

In the micro projection 6 shown in FIG. 10A, for example, the cross-sectional shape 6a can be formed so as to have the same size from the lower end side to the upper end side. That is, the micro projection 6 can have a round-columnar shape. Although the micro projection 6 having such a structure may be somewhat less than ideal in stiffness, an effect of allowing the micro projection 6 to look blackish can be exhibited and contrast with the mark 4 can be emphasized, as in the tapered micro projection 6 (shown in FIG. 8A and FIG. 8B). Furthermore, in this embodiment, a cross-sectional shape 14a of the recess 14 can have same size from the lower end side to the upper end side. Although the recess 14 having such a structure may be less than ideal in stiffness, the recess 14 can exhibit a light absorbing effect and emphasize contrast with the mark 4, similarly to the reversely tapered recess 14 (shown in FIG. 8A and FIG. 8B).

In the micro projection 6 shown in FIG. 10B, the cross-sectional shape 6a can include a portion P, that is, a stepped portion P at which the cross-sectional shape 6a becomes smaller stepwise from the lower end side toward the upper end side. In the present embodiment, one step may be formed. However, a plurality of steps may be formed. In the micro projection 6 having such a structure, an effect of allowing the micro projection 6 to look blackish can be exhibited and contrast with the mark 4 can be emphasized while relatively high stiffness can be ensured, similar to the tapered micro projection 6 (shown in FIG. 8A and FIG. 8B). In the micro projection 6 of the present embodiment, a portion Y1 above the stepped portion P and a portion Y2 below the stepped portion P may each be in the form of a round-columnar shape. However, the portions Y1 and Y2 may also be tapered as shown in FIG. 8A and FIG. 8B, for instance.

In the micro projection 6 shown in FIG. 10C, at a portion (stepped portion) P at which the cross-sectional shape 6a becomes smaller stepwise, portions K of one cross-sectional shape 6a and the other cross-sectional shape 6a can be in contact with each other. The micro projection 6 having such a structure may allow contrast to have directivity and can generate unexpected outer appearance.

Figure 11B:
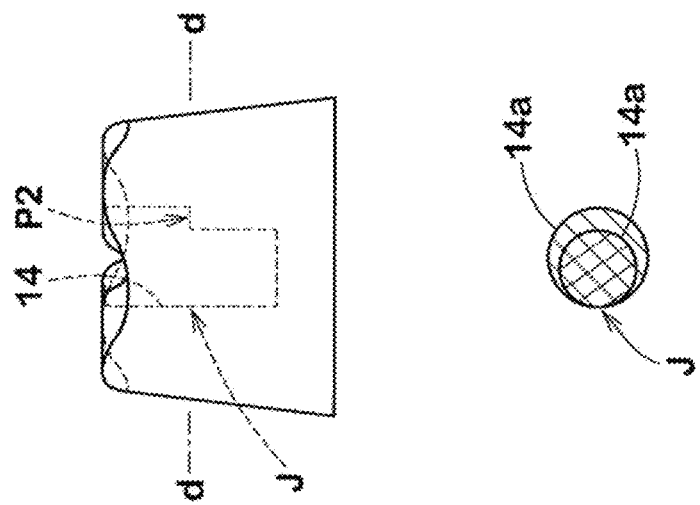
FIGS. 11A and 11B each illustrate a side view of a micro projection according to still another embodiment of the present disclosure, along with a plan view of a cross-sectional shape of a recess at positions on a line d-d in each side view.
Figure 11A:
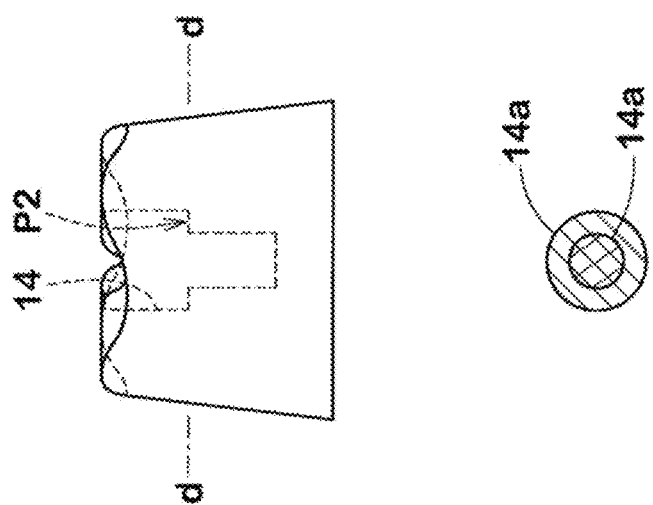

FIG. 11A and FIG. 11B are each a side view of a micro projection 6 according to still another embodiment of the present disclosure, and illustrate a cross-sectional shape 14a of a recess 14 at positions on a line d-d in each side view.

The same components between the micro projection 6 of the present embodiment and the micro projections 6 of the above-described embodiments are denoted by the same reference characters, and detailed description thereof is omitted.

In FIG. 11A, the recess 14 can include a portion P2, that is, a stepped portion P2 at which the cross-sectional shape 14a becomes larger stepwise from the lower end side toward the upper end side. In this embodiment, one step can be formed. However, a plurality of steps may be formed. The recess 14 having such a structure can exhibit a light absorbing effect and emphasize contrast with the mark 4 while relatively high stiffness can be ensured, similar to the reversely tapered recess 14 (shown in FIG. 8A and FIG. 8B).

In the micro projection 6 shown in FIG. 11B, at a portion (stepped portion) P2 at which the cross-sectional shape 14a becomes smaller stepwise, portions J of one cross-sectional shape 14a and the other cross-sectional shape 14a can be in contact with each other.

Figure 12A:
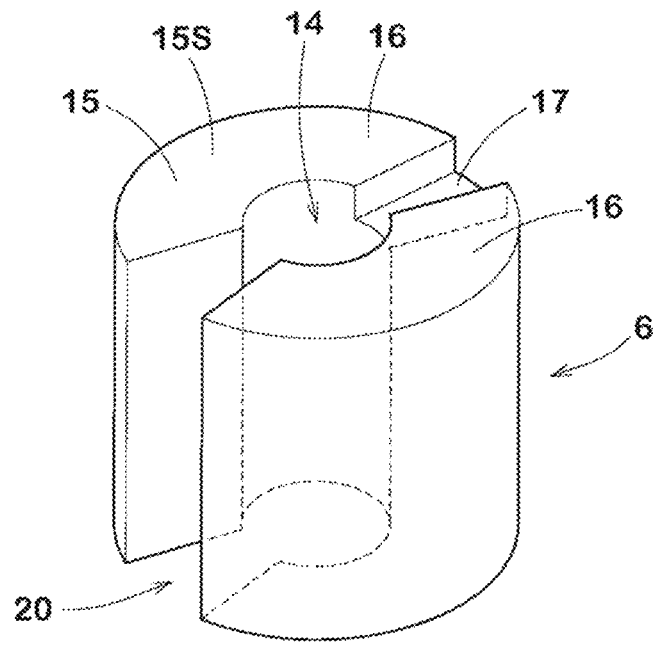
FIGS. 12A and 12B are a perspective view and a plan view, respectively, of a micro projection according to still another embodiment of the present disclosure.
Figure 12B:
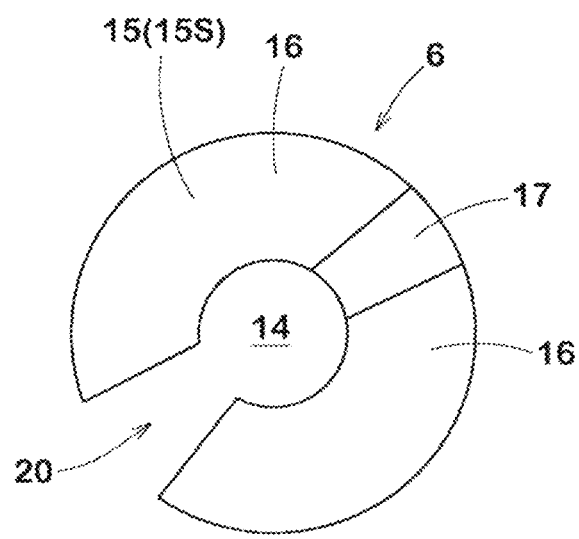

FIG. 12A and FIG. 12B are a perspective view and a plan view, respectively, of a micro projection 6 according to still another embodiment of the present disclosure. The same components between the micro projection 6 of the present embodiment and the micro projections 6 of the above-described embodiments are denoted by the same reference characters, and detailed description thereof is omitted.

In FIG. 12A and FIG. 12B, in the micro projection 6, an outer wall portion 15 can have two mountain portions 16 and one valley portion 17. Specifically, the outer wall portion 15 that surrounds a recess 14 may not be tubular but may be formed in a C-shape by a slit 20 so as to be disconnected in the circumferential direction, for instance. At a top face 15S of the outer wall portion 15, the two mountain portions 16 and the one valley portion 17 can be formed so as to be stepped. In this embodiment, the mountain portion 16 can have a flat surface.

A rib-like projection (for example, ridge) having a thickness reduced toward the upper end may be adopted as the micro projection 6. In this case, the rib-like projection (micro projection 6) may extend parallel to the outer edge of the mark 4.

Although the particularly embodiments of the present disclosure have been described above in detail, the present disclosure is not limited to the illustrated embodiments, and various modifications can be made to implement the present disclosure.

Examples (1) As shown in FIG. 1, pneumatic tires (e.g., pneumatic tire 1) each having indicia (character string of "ALKE") including marks, on a surface of a sidewall portion, were produced. In the tires 1, surface geometry arrangement regions, according to the specifications indicated in Tables 1 to 4, each having a plurality of micro projections were formed adjacent to the respective marks.

Tables 1 and 2 indicate tires of the first embodiment. The marks in Table 1 were recessed marks. The marks in Table 2 were projecting marks. In Tables 1 and 2, comparative examples 1A and 1B were tires having no surface geometry arrangement regions. Comparative examples 2A and 2B were tires having no first regions in any surface geometry arrangement region.

Tables 3 and 4 indicate tires of the second embodiment. The marks in Table 3 were recessed marks. The marks in Table 4 were projecting marks. In Tables 3 and 4, comparative examples 1C and 1D were tires having no surface geometry arrangement regions. Comparative examples 2C and 2D were tires having no third regions in any surface geometry arrangement regions.

Visibility of the indicia was tested for each tire. The common specifications and the test method were as follows.

<Common specifications>
Micro projection: column-shaped projection (e.g., FIG. 8A and FIG. 8B)
  Recess: present
  The number of mountain portions formed: 4
  Shape of upper end surface: curved surface
  Maximum height H1max <mm>: 0.3
  Minimum height H1min <mm>: 0.2
  Difference ΔH<mm>: 0.1
  Minimum width L2 <mm>: 0.41
  Maximum width L1 <mm>: 0.54
  Depth Hc<mm> of recess: 0.3
  Maximum width L3 <mm> of recess: 0.31
  Minimum width L4 <mm> of recess: 0.2
  Thickness W2 <mm>: 0.05
<Visibility>
Sensory evaluation for visibility was visually performed. In Table 1, the visibility is indicated as an index for evaluation with an index of comparative example 1A being 100. In Table 2, the visibility is indicated as an index for evaluation with an index of comparative example 1B being 100. In Table 3, the visibility is indicated as an index for evaluation with an index of comparative example 1C being 100. In Table 4, the visibility is indicated as an index for evaluation with an index of comparative example 1D being 100. The greater the value is, the more excellent the visibility is.

TABLE 1

|  | Comp. Ex. 1A | Comp. Ex. 2A | Ex. 1A | Ex. 2A | Ex. 3A | Ex. 4A | Ex. 5A | Ex. 6A |
|---|---|---|---|---|---|---|---|---|
| <Mark> Depth d or height h <mm> | | | | recessed mark d = 0.5 | | | | |
| <surface geometry arrangement region> | absent | | | present | | | | |
| Presence or absence of first region | absent | absent | | | present | | | |
| Presence or absence of second region | absent | present | | | present | | | absent |
| Ratio W7/W8 of first region width to second region width | — | — | 2 | 6 | | 4 | | — |
| Ratio A1/d of shortest distance A1 to depth d | — | — | | | 10 | 4 | 30 | 10 |
| Visibility | 100 | 102 | 110 | 120 | 150 | 130 | 140 | 105 |

TABLE 2

|  | Comp. Ex. 1B | Comp. Ex. 2B | Ex. 1B | Ex. 2B | Ex. 3B | Ex. 4B | Ex. 5B | Ex. 6B |
|---|---|---|---|---|---|---|---|---|
| <Mark> Depth d or height h | | | | projecting mark h = 0.5 | | | | |

TABLE 2-continued

| | Comp. Ex. 1B | Comp. Ex. 2B | Ex. 1B | Ex. 2B | Ex. 3B | Ex. 4B | Ex. 5B | Ex. 6B |
|---|---|---|---|---|---|---|---|---|
| <mm> <surface geometry arrangement region> | absent | | | | present | | | |
| Presence or absence of first region | absent | absent | | | | present | | |
| Presence or absence of second region | absent | present | | | present | | | absent |
| Ratio W7/W8 of first region width to second region width | — | — | 2 | 6 | 4 | | | — |
| Ratio A2/h of shortest distance A2 to height h | — | — | 12 | 0.6 | 30 | | | 12 |
| Visibility | 100 | 102 | 110 | 120 | 150 | 130 | 140 | 105 |

TABLE 3

| | Comp. Ex. 1C | Comp. Ex. 2C | Ex. 1C | Ex. 2C | Ex. 3C | Ex. 4C | Ex. 5C | Ex. 6C |
|---|---|---|---|---|---|---|---|---|
| <Mark> Depth d or height h <mm> | | | | recessed mark d = 0.5 | | | | |
| <surface geometry arrangement region> | absent | | | | present | | | |
| Presence or absence of third region | absent | absent | | | | present | | |
| Presence or absence of fourth region | absent | present | | | present | | | absent |
| Ratio W22/W23 of third region width to fourth region width | — | — | 2 | 6 | 4 | | | — |
| Ratio A3/d of shortest distance A3 to depth d | — | — | 10 | 4 | 30 | | | 10 |
| Visibility | 100 | 102 | 110 | 115 | 140 | 125 | 130 | 103 |

TABLE 4

| | Comp. Ex. 1D | Comp. Ex. 2D | Ex. 1D | Ex. 2D | Ex. 3D | Ex. 4D | Ex. 5D | Ex. 6D |
|---|---|---|---|---|---|---|---|---|
| <Mark> Depth d or height h <mm> | | | | projecting mark h = 0.5 | | | | |
| <surface geometry arrangement region> | absent | | | | present | | | |
| Presence or absence of third region | absent | absent | | | | present | | |
| Presence or absence of fourth region | absent | present | | | present | | | absent |
| Ratio W22/W23 of third region width to fourth region width | — | — | 2 | 6 | 4 | | | — |
| Ratio A4/h of shortest distance A4 to height h | — | — | 10 | 0.6 | 30 | | | 10 |
| Visibility | 100 | 102 | 110 | 115 | 140 | 125 | 130 | 103 |

As indicated in Tables 1 to 4, it can be confirmed that visibility of the indicia was superior in the tires of the examples according to embodiments of the present disclosure.

In the tire of embodiments of the present disclosure, the surface geometry arrangement region can have a shape edge defining an outer edge of the surface geometry arrangement region, and the first region can be disposed along the shape edge.

In the tire of embodiments of the present disclosure, the mark can include a recessed mark having a depth d, and a shortest distance A1 from an outer edge of the mark to an outer edge of the surface geometry arrangement region can be greater than the depth d, as viewed from a front of the sidewall portion.

In the tire of embodiments of the present disclosure, the shortest distance A1 may be 4 to 30 times the depth d of the mark, for instance.

In the tire of embodiments of the present disclosure, the mark can include a projecting mark having a height h, and a shortest distance A2 from an outer edge of the mark to an outer edge of the surface geometry arrangement region can be greater than the height h, as viewed from a front of the sidewall portion.

In the tire of embodiments of the present disclosure, the shortest distance A2 may be 0.6 to 30 times the height h of the mark, for instance.

In the tire of embodiments of the present disclosure, the surface geometry arrangement region can include a second region in which the micro projections having a constant height are disposed, between the first region and the mark.

In the tire of embodiments of the present disclosure, a width of the first region can be 2 to 6 times a width of the second region, for instance.

In the tire of embodiments of the present disclosure, the surface geometry arrangement region can have a shape edge defining an outer edge of the surface geometry arrangement region, and the third region can be disposed along the shape edge.

In the tire of embodiments of the present disclosure, the mark can include a recessed mark having a depth d, and a shortest distance A3 from an outer edge of the mark to an outer edge of the surface geometry arrangement region can be greater than the depth d, as viewed from a front of the sidewall portion.

In the tire of embodiments of the present disclosure, the shortest distance A3 can be 4 to 30 times the depth d of the mark, for instance.

In the tire of embodiments the present disclosure, the mark can include a projecting mark having a height h, and a shortest distance A4 from an outer edge of the mark to an outer edge of the surface geometry arrangement region can be greater than the height h, as viewed from a front of the sidewall portion.

In the tire of embodiments of the present disclosure, the shortest distance A4 can be 0.6 to 30 times the height h of the mark, for instance.

In the tire of embodiments of the present disclosure, the surface geometry arrangement region can include a fourth region in which the micro projections are disposed at a constant density, between the third region and the mark.

In the tire of embodiments of the present disclosure, a width of the third region can be 2 to 6 times a width of the fourth region, for instance.

In the tire of embodiments of the present disclosure, the micro projections each can include a recess and an outer wall portion surrounding the recess and forming a top face.

In the tire of embodiments of the present disclosure, the top face of the outer wall portion can include at least two mountain portions each having a relatively large projection height in a projection height direction.

In the tire of embodiments of the present disclosure, in the top face, the mountain portions and valley portions each can have a relatively small projection height, for instance, alternate in a circumferential direction.

In the tire of embodiments of the present disclosure, the top face can be a curved surface in which mountain portions and valley portions are connected by smooth curved surfaces.

In the present disclosure, as described above, the surface geometry arrangement region having the plurality of micro projections can be formed adjacent to the mark outside the mark. The surface geometry arrangement region can include, in at least a part thereof, the first region formed such that the greater a distance from the mark is, the less the heights of the micro projections are, or the third region formed such that the greater a distance from the mark is, the less the density of the micro projections is.

In such a surface geometry arrangement region, a plurality of micro projections may inhibit light from being reflected and can enhance light absorptivity. Therefore, the surface geometry arrangement region can be allowed to look darker as compared with a region other than the surface geometry arrangement region. Furthermore, in the first region, the greater a distance from the mark is, the less the heights of the micro projections may be, or, in the third region, the greater a distance from the mark is, the less a density of the micro projections may be, so that the light absorptivity can be gradually reduced, and a region farther from the mark can become brighter.

Thus, the shadow of the mark can be rendered by the surface geometry arrangement region, and, for example, the mark can appear as if it floats. As a result, the appearance can be enhanced, and the mark can be represented, for instance, with a stereoscopic effect, to enhance visibility of the mark.

Particularly, the surface geometry arrangement region can include the first region or the third region. Thus, the periphery of the surface geometry arrangement region can be blurred and the surface geometry arrangement region can be allowed to more closely resemble an actual shadow.

What is claimed is:

1. A tire comprising:

a sidewall portion, wherein at least one mark formed by a character or a figure is disposed on a surface of the sidewall portion, wherein a surface geometry arrangement region having a plurality of micro projections is formed adjacent to the mark on the surface of the sidewall portion outside the mark, and wherein the surface geometry arrangement region comprises a first region formed in at least a part of the surface geometry arrangement region such that the greater a distance from the mark is, the less a maximum height of the micro projections is, and wherein the surface geometry arrangement region having the plurality of micro projections has a shape and an area the same as a portion of the mark.

2. The tire according to claim 1, wherein the surface geometry arrangement region defines an outer edge of the surface geometry arrangement region, and wherein the first region is disposed along the outer edge.

3. The tire according to claim 1, wherein the mark comprises a recessed mark having a depth, and wherein a shortest distance from an outer edge of the mark to an outer edge of the surface geometry arrangement region is greater than the depth as viewed from a front of the sidewall portion.

4. The tire according to claim 3, wherein the shortest distance is 4 to 30 times the depth of the mark.

5. The tire according to claim 1, wherein the mark comprises a projecting mark having a height, and wherein a shortest distance from an outer edge of the mark to an outer edge of the surface geometry arrangement region is greater than the height, as viewed from a front of the sidewall portion.

6. The tire according to claim 5, wherein the shortest distance is 0.6 to 30 times the height of the mark.

7. The tire according to claim 1, wherein the surface geometry arrangement region comprises a second region in which the micro projections having a constant height are disposed, between the first region and the mark.

8. The tire according to claim 7, wherein a width of the first region is 2 to 6 times a width of the second region.

9. The tire according to claim 1, wherein the micro projections each comprise a recess and an outer wall portion surrounding the recess and forming a top face.

10. A tire comprising:

a sidewall portion, wherein at least one mark formed by a character or a figure is disposed on a surface of the sidewall portion, wherein a surface geometry arrangement region having a plurality of micro projections is formed adjacent to the mark on the surface of the sidewall portion outside the mark, wherein the surface geometry arrangement region comprises a first region formed in at least a part of the surface geometry arrangement region such that the greater a distance from the mark is, the less a maximum height of the micro projections is, wherein the maximum heights of the micro projections never increase as the distance from the mark increases, and wherein a second side of the mark opposite a first side of the mark at which the surface geometry arrangement region is adjacent is without any surface geometry arrangement region or regions.

* * * * *